March 7, 1939.  T. H. CLACK  2,150,024
RUG MAKING
Filed Oct. 25, 1938
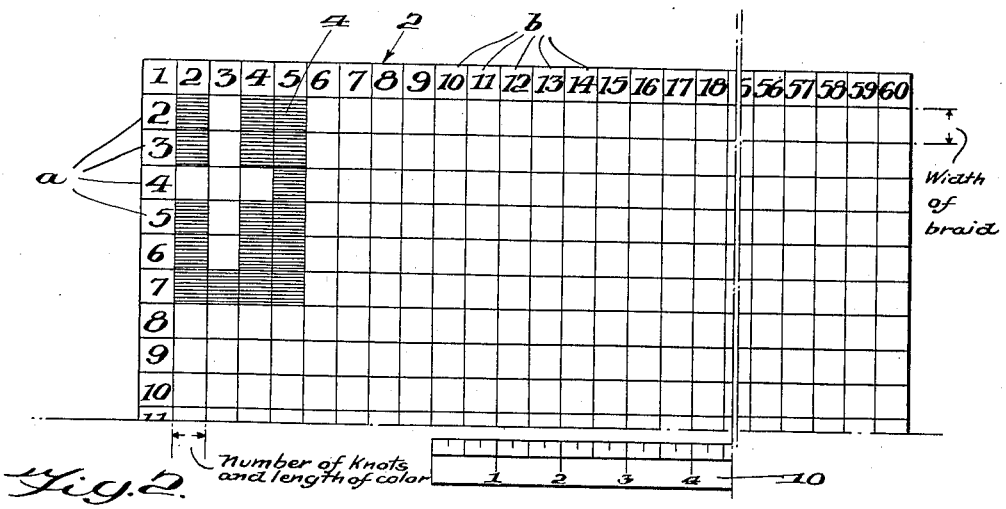
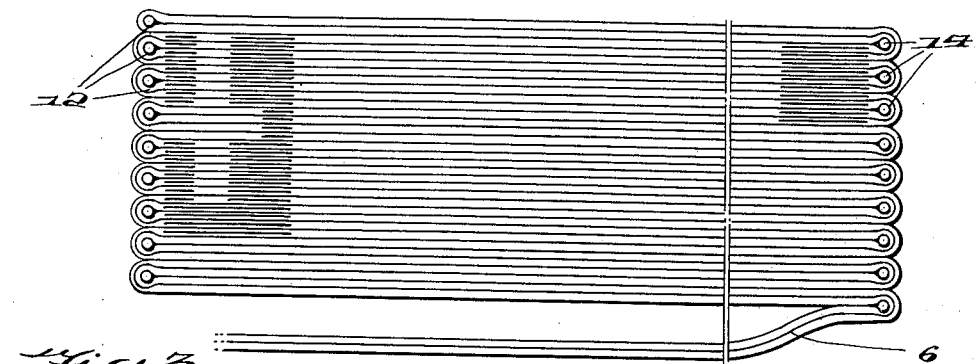
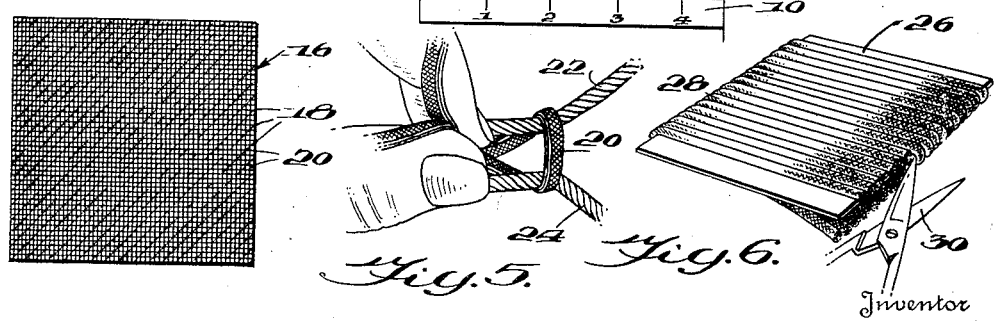
Inventor
Thomas H. Clack,
By Bailey & Parsons
Attorney Patented Mar. 7, 1939

2,150,024

UNITED STATES PATENT OFFICE 2,150,024

RUG MAKING

Thomas H. Clack, New York, N. Y.

Application October 25, 1938, Serial No. 236,947

6 Claims. (Cl. 28—1)

This invention is a continuation-in-part of my application for Rug and method of making the same, Serial No. 198,138, filed March 25, 1938.

Said prior application disclosed the manner of forming a braid on a loom and the manner of making rugs with said braid, said rugs having, if desired, color patterns made according to the color patterns denoted by a chart. The present invention relates to an improved method of forming the chart, and of forming a rug with a design copied from the chart. The instant invention also relates to the novel means of employing fabric strips in the making of the rug.

It is an object of this invention to make a rug from a length of braid having knots tied thereon, according to directions given by a chart, which braid, when assembled into a rug, substantially accurately reproduces a design previously outlined upon the chart.

A further object of this invention is to provide a means for arranging the portions of the braid as they are being formed so they will be assembled in proper and accurate position to reproduce a design.

A further object is to form a braid with colors thereon as indicated by a chart, and then assemble the braid into a rug to reproduce the design in the rug in the same, or in a proportionate size.

A still further object of the invention is to use strips of material cut on the bias and folded before being knotted upon a braid in order to produce a more luxuriant pile.

A further object of the invention is to provide means for obtaining the proper lengths and number of color pieces to be used in making a particular portion of a color pattern.

Generally, these, and other objects of my invention are obtained by first taking a design and superimposing thereon a graph so that the design is marked off in horizontal and vertical lines, the horizontal lines denoting the width of a length of completed braid, while the vertical lines represent the number of knots of any particular color to be tied on the braid. As the braid is completed, it is assembled upon a frame so that the various colored portions thereon fall with respect to one another to reproduce the design on the chart. It has been found that as the knots are tied on the braid, the number of knots in any particular color series can be adjusted to an accurate length by measuring them with a ruler and checking their length with the length of color indicated in the chart. Should the series of knots be so close together as to constitute a short color length, they can be worked apart manually to the proper length, or, if the series of knots is too long, they can be shoved together until they reach the proper length. In order to obtain a more resilient piece of material that will give a thicker and more springy pile, pieces of material may be cut on the bias, and these cut pieces folded, and in folded condition be used to tie the knots. If worsted is used, a length of worsted can be wound about a piece of cardboard and then cut along one edge of the cardboard, which will give a number of pieces of worsted of uniform length to be used in tying knots. Furthermore, the cardboard piece can be used in connection with the chart to make, at one cutting, the required number of similar colored pile pieces, inasmuch as if the chart indicates that five knots of one color shall be formed on the braid, five turns of twine can be placed on the cardboard, and cut to obtain the proper number of pile pieces.

A means by which I obtain the objects of my invention and other objects, is shown in the drawing, in which:

Fig. 1 is a plan view of a chart with a partial design indicated thereon.

Fig. 2 is a plan view of a rug made by the assembling of the braid.

Fig. 3 is a plan view of a strip of material showing how the same can be cut on a bias.

Fig. 4 is a perspective view showing a piece of material cut on the bias and folded.

Fig. 5 is a perspective view showing the material of Fig. 4 being tied on the braid; and Fig. 6 is a perspective view showing how worsted is wrapped around a board and cut to proper length.

In making the chart 2 from which the rug is to be formed, a design, such as denoted generally at 4, Fig. 1, is ruled, or has otherwise a graph superimposed thereon by means of horizontal and vertical lines. The horizontal lines delineate horizontal rows $a$, and each row indicates the width of the braid to be formed, while the vertical lines delineate vertical rows $b$, and each vertical row indicates the number of knots and lengths of color to be formed upon the braid in its respective row $a$. The vertical rows are shown numbered from 1 to 60, and the horizontal rows numbered from 1 to 10, thus allowing any square to be readily identified. The braid completed is shown at 6 in Fig. 2, this braid being made upon a rug making device such as described in my Patent No. 2,112,395, of March 29, 1938, and in a manner as set forth in said patent and in my aforesaid application Serial No. 198,138, filed March 25, 1938.

When beginning to make the braid, the operator can visually ascertain from the chart that the first portion of the braid, as denoted under the numeral 2 in a vertical column b, will be formed of blue pieces of material for a length indicated by the width of row b. For example, by directions accompanying the chart or indicated clearly upon the face of the chart, the length of the colored portion of the braid may be one inch, and the length of the series of knots correspondingly must be equal to one inch. The number of pile pieces required for one inch of braid of course depends upon the bulkiness of the materials used, and if heavy materials are used to form the pile pieces, it may be that only five pile pieces will be knotted on the braid strands in order to obtain a completed portion of the braid one inch long. As a matter of actual practice, the width of the braid, as denoted by rows a, does not need to be equal to the length of color as denoted by rows b, and therefore the chart in Fig. 1 does not represent the only proportions of an actual chart. However, this is immaterial because it is obvious that this system of following a chart will not be changed, regardless of whether the horizontal and vertical lines are in the proportions illustrated in Fig. 1. It is only essential that the braid formed from the chart reproduce, in actual proportions, the design on the chart.

Inasmuch as rugs of this sort are made by unskilled persons, and inasmuch as substantially each individual will tie knots with a different tightness from another person, and perhaps use slightly different material from that for which the chart was calibrated, it has been found necessary to provide an additional means of ensuring that the length of color obtained upon the braid actually corresponds to the chart. For this purpose, a ruler 10 is used, and if the chart indicates that the first blue square 2a, 2b, is to be one inch in length, the ruler 10 is placed against the blue knots formed on the braid, and these knots are adjusted until they are actually one inch in length. The operator then continues to follow the chart, and makes, in succession, one inch in white knots, square 2a, 3b, and then two inches in blue knots, squares 2a—4b, 5b, and follows the pattern out, as designated in horizontal row 2. As each length of knots is completed, their length is checked by means of the ruler, and the knots are adjusted to proper length upon the braid. It is also preferable to check the total length of a completed portion of the knots of different colors so that any errors which may have accumulated can be adjusted before the braid is assembled into the rug. Experience has demonstrated that every ten inches of braid should be carefully checked, and that this braid be assembled as shown in Fig. 2 before making more braid. After a length of braid has been completed, as indicated by horizontal row 2, the chart is followed backward from left to right, the same system being employed, and the completed braid reversed upon itself, as indicated in Fig. 2, wherein it will be found that the colored portions of the braid will lie adjacent to one another as indicated by the chart. For example, as shown by comparing Figs. 1 and 2, the colored square, 2a, 5b, will lie adjacent the colored square 3a, 5b.

In Fig. 2 pegs are shown at 12 and 14 for the purpose of holding the braid 6 in place as it is being assembled. These pegs, nails, or the like, may be inserted into a board, or be made part of a frame. It is, of course, necessary that the pegs 12 and 14 be spaced apart a distance equal to the length of a row a of braid 10 as indicated by the chart. Proportionate lengths may also be used, as, for example, the rug may be made twice the size of the chart, and therefore the distance between pegs 12 and 14 will be twice the length of row a on chart 2. Whether the rug is to be larger or smaller than the chart, care must be exercised in keeping the distance between pegs 12 and 14 in proper proportion so that the colors in rows a of Fig. 1 will be reproduced in the same order in the rows of braid assembled in Fig. 2.

The chart presents very many other advantages in the making of rugs. For example, it can be determined that in using certain weights of materials, each row of braid will have to be made of so many pieces of different colored materials, and consequently, the total amount of material necessary for the completed rug can be estimated and sold with the chart with the assurance that the design upon the chart can be reproduced with the color and quantity of materials sold therewith. Likewise, the chart can indicate how many pieces of material are needed to form each color length upon the braid, depending upon the texture desired in the finished product. For example, for rugs of one texture, knots formed of individually tied pile pieces can be made, while for another texture, two or more pile pieces can be bunched together and tied as a single unit upon the braid.

In order to get a particular type of texture upon the rug, a piece of fabric as indicated at 16, Fig. 3, can be cut along bias lines 18 to obtain from the fabric a strip of bias-cut material 20. This strip of material 20 is, as shown in Fig. 4, preferably folded either once or a plurality of times, and in its folded state is tied upon braid stands 22 and 24, as illustrated in Fig. 5. The cutting of the material on the bias produces a resilient piece of material, and this enables a tighter knot to be formed upon the braid. Again, the folding of the material enables a very close and compact texture to be formed in the surface of the completed rug.

Inasmuch as the chart 2 illustrated in Fig. 1 may indicate the number of knots as well as the color length thereof, a convenient means of obtaining the number of knots is shown in Fig. 6. In said figure, a piece of wood or cardboard, or any convenient material 26 having a width approximately equal to one-half the length of pile piece desired, has therearound a number of turns of worsted 28, which are severed along one edge by scissors 30. For example, if the length of color on the braid is to be one inch and the chart indicates that one inch of color can be obtained through the use of 17 pile pieces, then 17 turns of worsted are made upon the sheet 26 of Fig. 6. The worsted is then severed at one end by the scissors 30 and the required number of color pieces are at once obtained, it being noted, at the same time, that the pieces are all of the same length, so that an even length pile will be formed upon the braid. Likewise, other colors can be formed quickly and without waste upon the sheet 26, and, if desired, enough pieces can be cut at one time for all that particular color in the rug, and these pieces put aside until that color on the braid is to be used. It should be noted that if several pile pieces are to be bunched together and used as a unit to make a single knot on the braid, the sheet 26 will be calibrated to form the number of pile pieces, rather than the length of color upon the braid. In other words, one inch of yarn on the sheet 26 will not necessarily be one inch of color on the chart, but may be only one-half inch of color on the braid if two pile pieces are used to make one knot.

According to a further use of the board 26, the same can be made with a width equal to the length of each pile piece. In such case the yarn must be cut along each opposite edge of the board, and accordingly double the number of pile pieces will be formed over the method before described.

It is evident that by the means disclosed, a design can be accurately and quickly reproduced in a rug by following the chart, and that this can be done by relatively unskilled operators. By the means disclosed, an ordinary person can make very luxurious and beautiful rugs with intricate designs worked therein, which has not been possible in other means known to the art.

Having disclosed the means by which I obtain the objects of my invention, what I claim is:

1. The method of forming a braided pile according to a predetermined design comprising preparing a chart showing the position of and length of colors upon the braid, preparing a board-like element into a width commensurate with the length of pile piece desired, wrapping a continuous length of pile material around said element a number of times equal to the number of pile pieces necessary to form the length of color on the braid as indicated by said chart, severing said wrapped material lengthwise of said element to produce a plurality of equal length pile pieces, and tying said pile pieces upon strands to form a completed portion of the braid as indicated by said chart.

2. A method as in claim 1, comprising bunching a plurality of said pile pieces, and tying said pieces as a unit to form a single knot upon said strands.

3. The method of making a design in a rug as indicated by a chart from a braid having pile forming knots thereon, comprising tying colored knots of one color on said braid as directed by said chart, similarly tying different colored knots, adjusting said knots to produce predetermined lengths of colored braid having colored portions thereon with each portion in proportion to color lengths indicated by said chart, and fastening said braid with the braid lengths lying side by side to reproduce in said rug the design of said chart.

4. A method of making a rug according to a predetermined design as shown by a chart having the individual color lengths of braid marked thereon, from braid having pile forming knots thereon, comprising tying a plurality of pile forming knots upon said braid to form on said braid a length of one color, tying a plurality of knots of different color to form at least a second length of a second color, adjusting said lengths of colored knots to the substantially accurate length called for by said chart, and fastening braid portions side by side to bring the adjusted color lengths into proper relative relationship to each other to reproduce the design indicated by said chart.

5. The method of making a design in a rug as indicated by a chart from a braid having pile forming knots thereon, comprising tying knots on said braid the color and number of which are indicated by said chart to make a length of one color upon said braid, similarly tying other numbers of knots of other colors to obtain other lengths of color on said braid in the order indicated by said chart, adjusting the knots on said braid to make each color length thereon agree with said chart as to length of color, and fastening braid portions side by side to bring the adjusted color lengths into proper relative relationship to each other to reproduce the design indicated by said chart.

6. In the manufacture of patterned pile rugs having pile braid secured together in side by side relation in accordance with a chart having indicia each representing a predetermined number of colored pile forming pieces on a braid in a predetermined length of the braid, the steps of tying pile pieces on a braid to form a group of pile knots of a single color in the number indicated by said chart to give a certain length of color, tying on the braid pile pieces to form a group of pile knots of another color in the number indicated by the chart to give a certain length of color, adjusting each group of tied knots to the length indicated by the chart, and continuing such tying and adjusting until a rug braid is formed.

THOMAS H. CLACK.